(12) United States Patent
Zhuo et al.

(10) Patent No.: US 11,194,487 B2
(45) Date of Patent: Dec. 7, 2021

(54) METHOD, ELECTRONIC DEVICE AND COMPUTER PROGRAM PRODUCT OF ALLOCATING STORAGE DISKS

(71) Applicant: EMC IP Holding Company LLC, Hopkinton, MA (US)

(72) Inventors: Baote Zhuo, Beijing (CN); Jian Gao, Beijing (CN); Geng Han, Beijing (CN); Ruiyong Jia, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 36 days.

(21) Appl. No.: 16/885,976

(22) Filed: May 28, 2020

(65) Prior Publication Data

US 2021/0132831 A1    May 6, 2021

(30) Foreign Application Priority Data

Oct. 31, 2019    (CN) .......................... 201911052954.6

(51) Int. Cl.
*G06F 12/00*    (2006.01)
*G06F 3/06*    (2006.01)

(52) U.S. Cl.
CPC .......... *G06F 3/0631* (2013.01); *G06F 3/0604* (2013.01); *G06F 3/0614* (2013.01); *G06F 3/0629* (2013.01); *G06F 3/0644* (2013.01); *G06F 3/0673* (2013.01); *G06F 3/0674* (2013.01); *G06F 3/0689* (2013.01)

(58) Field of Classification Search
CPC .... G06F 3/0631; G06F 3/0673; G06F 3/0604; G06F 3/0689; G06F 3/0629; G06F 3/0644; G06F 3/0674; G06F 3/0614
See application file for complete search history.

(56) References Cited

U.S. PATENT DOCUMENTS

| | | | | |
|---|---|---|---|---|
| 6,317,808 | B1 * | 11/2001 | Berenshteyn | G06F 3/0607 710/39 |
| 8,533,103 | B1 * | 9/2013 | Certain | G06Q 10/06 705/37 |
| 10,860,259 | B1 * | 12/2020 | Winarski | G06F 3/0649 |
| 2003/0074527 | A1 * | 4/2003 | Burton | G06F 3/0601 711/114 |
| 2007/0118689 | A1 * | 5/2007 | Hyde, II | G06F 3/0607 711/114 |
| 2008/0140930 | A1 * | 6/2008 | Hotchkiss | G06F 3/0631 711/114 |
| 2015/0205668 | A1 * | 7/2015 | Sundaram | G06F 3/0688 714/6.24 |

(Continued)

*Primary Examiner* — John A Lane
(74) *Attorney, Agent, or Firm* — BainwoodHuang

(57) ABSTRACT

Techniques for allocating storage disks involve: determining, from storage disks to be allocated, groups of storage disks, where each of groups of storage disks includes storage disks corresponding to one disk array; selecting, from the groups of storage disks, a group of target storage disks, the group of target storage disks having an unavailable capacity lower than a first capacity threshold; and creating, based on the storage disks, a storage disk set including at least the group of target storage disks. Accordingly, the storage disk set with optimized available capacity may be found with fewer computing overheads.

21 Claims, 6 Drawing Sheets

(56) References Cited

U.S. PATENT DOCUMENTS

| | | | |
|---|---|---|---|
| 2016/0004615 A1* | 1/2016 | Uehara | G06F 3/0619 |
| | | | 714/6.22 |
| 2016/0342609 A1* | 11/2016 | Jibbe | G06F 11/14 |
| 2018/0018113 A1* | 1/2018 | Koseki | G06F 12/02 |
| 2019/0065093 A1* | 2/2019 | Karr | G06F 3/0649 |
| 2019/0317682 A1* | 10/2019 | Li | G06F 3/0632 |
| 2020/0241757 A1* | 7/2020 | Lee | G06F 3/067 |
| 2021/0132844 A1* | 5/2021 | Shang | G06F 3/0604 |
| 2021/0132845 A1* | 5/2021 | Shang | G06F 3/0604 |

* cited by examiner

METHOD, ELECTRONIC DEVICE AND COMPUTER PROGRAM PRODUCT OF ALLOCATING STORAGE DISKS

CROSS-REFERENCE TO RELATED APPLICATION

This application claims priority to Chinese Patent Application No. CN201911052954.6, on file at the China National Intellectual Property Administration (CNIPA), having a filing date of Oct. 31, 2019, and having "METHOD, ELECTRONIC DEVICE AND COMPUTER PROGRAM PRODUCT OF ALLOCATING STORAGE DISKS" as a title, the contents and teachings of which are herein incorporated by reference in their entirety.

FIELD

Embodiments of the present disclosure generally relate to the field of computers, and more specifically, to a method, electronic device and computer program product for allocating storage disks.

BACKGROUND

A storage system based on Redundant Array of Independent Disks (RAID) generally includes a number of disks, which are also referred to as storage disks. In case of a failure in a storage disk, the storage system can restore the data in the disk having the failure by utilizing data in other storage disks. However, in a case where there are a large number of storage disks, the possibility of a failure occurring in the entire storage system rises. In practice, the number of storage disks should be limited and a set of storage disks created with a limited number usually is referred to as a RAID Resilience Set (RRS for short hereinafter). A current technical issue is how to provide an approach in which storage disks in the storage system can be effectively allocated into a plurality of disk sets, thereby reducing the risk resultant from the storage disk failure.

SUMMARY

Embodiments of the present disclosure provide a solution for allocating storage disks.

In a first aspect of the present disclosure, there is provided a method for allocating storage disks. The method includes: determining, from multiple storage disks to be allocated, multiple groups of storage disks, where each of the multiple groups of storage disks includes storage disks corresponding to one disk array; selecting, from the multiple groups of storage disks, a group of target storage disks, where the group of target storage disks has an unavailable capacity lower than a first capacity threshold; and creating a storage disk set based on the multiple storage disks, where the storage disk set includes at least the group of target storage disks.

In a second aspect of the present disclosure, there is provided an electronic device. The device includes: a processor and a memory coupled to the processor, the memory includes instructions stored thereon, where the instructions, when executed by the processor, cause the electronic device to perform acts including: determining, from multiple storage disks to be allocated, multiple groups of storage disks, where each of the multiple groups of storage disks include storage disks corresponding to one disk array; selecting, from the multiple groups of storage disks, a group of target storage disks, where the group of target storage disks has an unavailable capacity lower than a first capacity threshold; and creating a storage disk set based on the multiple storage disks, where the storage disk set includes at least the group of target storage disks.

In a third aspect of the present disclosure, there is provided a computer program product tangibly stored on a computer-readable medium and including machine-executable instructions, the machine-executable instructions, when executed, causing a machine to perform any steps of the method according to the first aspect.

This Summary is provided to introduce a selection of concepts in a simplified form that are to be further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in example embodiments of the present disclosure, wherein.

DETAILED DESCRIPTION OF EMBODIMENTS

Figure 1:
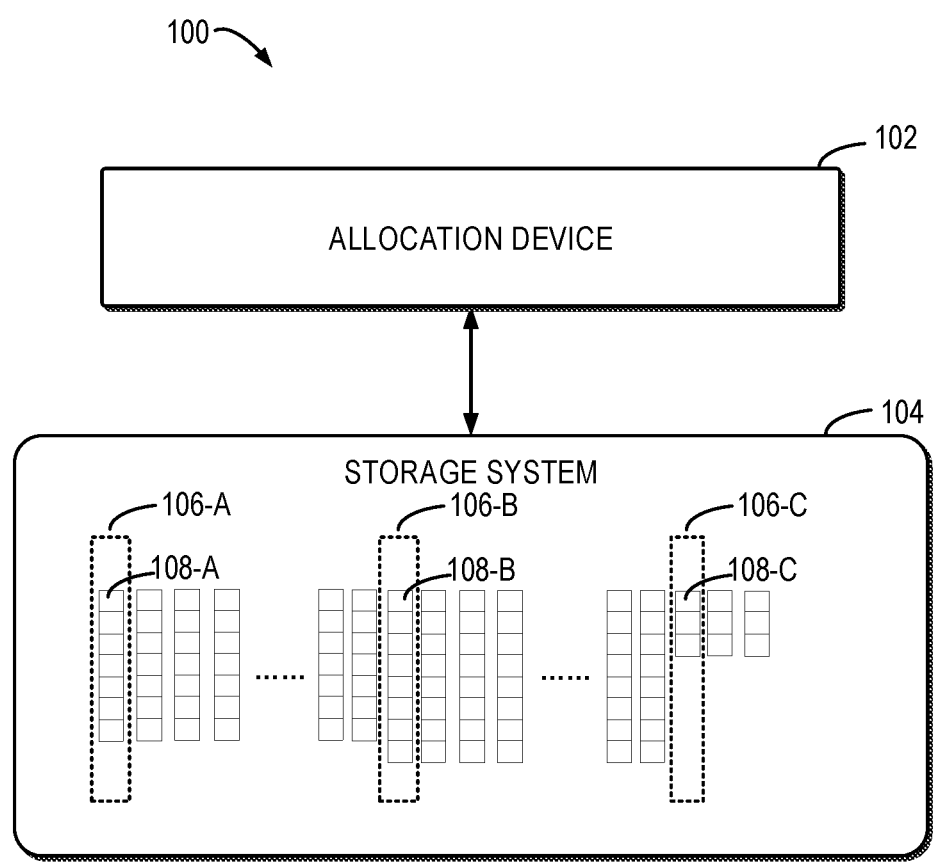
FIG. 1 illustrates a schematic diagram of an example environment in accordance with embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although some preferred embodiments of the present disclosure are shown in the drawings, it should be appreciated that description of those embodiments is merely to enable those skilled in the art to have a better understanding of the present disclosure and further implement the present disclosure, and is not to limit the scope of the present disclosure in any manner.

As used herein, the term "include" and its variants are to be read as open-ended terms that mean "include, but is not limited to." The term "or" is to be read as "and/or" unless explicitly defined otherwise. The term "based on" is to be read as "based at least in part on." The terms "one example embodiment" and "an embodiment" are to be read as "at least one example embodiment." The term "another embodiment" is to be read as "at least one further embodiment." The terms "first" and "second" can represent different or the same objects. Other definitions, either explicit or implicit, may be included hereinafter.

FIG. 1 illustrates a schematic diagram of an example environment in accordance with the present disclosure. As shown, the environment 100 includes an allocation device 102 and a storage system 104.

In an example, the storage system 104 contains a plurality of storage disks having different capacities, such as multiple first storage disks 106-A with a first capacity C1, multiple second storage disks 106-B having a second capacity C2 and a multiple third storage disks 106-C having a third capacity C3. The storage system 104 may also include a storage disk having other capacity. The plurality of storage disks may be allocated as one or more storage disk sets, one example of which is RAID Resilience Set (RRS).

A storage disk may be one of various types of devices having a storage function, including but not limited to, Hard Disk Drive (HDD), Solid State Disk (SSD), removable disk, Compact Disk (CD), laser disk, optical disk, Digital Versatile Disk (DVD), floppy disk, blue-ray disk, Serial Attached Small Computer System Interface (SCSI) Storage Disk (SAS), Serial Advanced Technology Attachment (SATA) storage disk, any other magnetic storage devices, any other optical storage devices or combinations thereof. A disk array may be constructed by storage disks, and one example of the disk array may be Redundant Arrays of Independent Disks (RAID).

According to FIG. 1, the first storage disks 106-A each may include a plurality of disk slices 108-A, the second storage disks 106-B each may include a plurality of disk slices 108-B and the third storage disks 106-C each may contain a plurality of disk slices 108-C. The sets of storage disks may include multiple disk slice sets (e.g., Uber). A disk slice set may be considered as a small RAID (with respect to a large RAID included of physical storage disks) which is used for providing physical storage space for a mapper. Data may be read from or written into the disk slice sets using a RAID algorithm. For example, if a RAID is created in the form of RAID-5 (4+1), 5 free storage blocks from different storage disks may be allocated and then combined into a small RAID.

Drive slices forming one disk slice set are not necessarily from the same storage disk. In one example, the disk slices forming the one disk slice set may come from different storage disks as long as the different storage disks are located in the same storage disk set.

In one example, RAID 5 with a disk array width of 4+1 is utilized in the storage system, which indicates that the number of storage disks in the RAID 5 is 4+1=5, where four storage disks store data and one storage disk stores parity data. The width of a disk array denotes the number of disks forming the disk array. In other examples, RAID 5 with a disk array width of 4+1, RAID 5 with a disk array width of 8+1 or RAID 5 with a disk array width of 16+1 may also be utilized.

In one example, for RAID 5 with the disk array width of 4+1, one disk slice set may be 16 GB in size, where each disk slice has a capacity of 4 GB. The above example is provided merely for illustrating the present disclosure, rather than being a limitation. In other examples, the disk slice and disk slice set may be set to any size as needed.

The allocation device 102 is configured to allocate the first storage disks 106-A, the second storage disks 106-B and the third storage disks 106-C into multiple storage disk sets. A resultant storage disk set generally should meet some conditions. For example, in case of a storage disk (or disk slice) failure, a data rebuilding operation is needed to be performed for all storage disks in the storage disk set, so as to ensure data reliability. However, the rebuilding process is quite long in a case that there are a large number of storage disks. Accordingly, if the total number of storage disks is huge, the allocation device may advantageously allocate the storage disks into multiple sets of storage disks, which can facilitate a quick data rebuilding while ensuring a high reliability.

The allocation device 102 may be coupled in communication with the storage system 104 and may dynamically obtain the total number of storage disks in the storage system and respective capacities of the storage disks. The allocation device 102 may also be a part of the storage system, such as a controller in the storage system. Embodiments of the present disclosure are not limited in this regard.

In one example, the allocation device 102 may detect the total number of storage disks in the storage system and respective capacities of the storage disks periodically, such as once every other day. In a further example, the allocation device 102 may detect, in response to an insertion of a new storage disk sensed by an interface controller for the storage disks, the total number of storage disks in the storage system and respective capacities of the storage disks. The allocation device 102 may also determine, in accordance with an updated total number of storage disks in the storage system and respective capacities of these storage disks, whether a reallocation should be performed on the storage disks so as to re-determine updated storage disk sets.

Figure 2A:
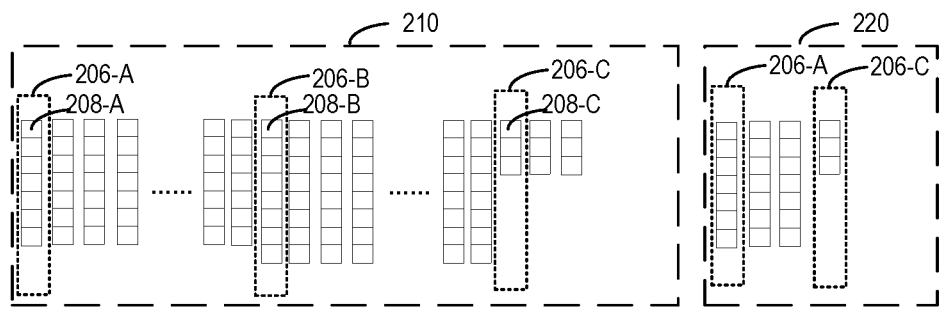
FIG. 2A illustrates a schematic diagram of a storage system in accordance with embodiments of the present disclosure.

FIG. 2A illustrates an example of a storage system in accordance with embodiments of the present disclosure. Referring to FIG. 2A, an initial storage disk set 210 in the storage system 200 contains first storage disks 206-A each with a first physical storage capacity C1, second storage disks 206-B each with a second physical storage capacity C2 and third storage disks 206-C each with a third physical storage capacity C3, where C2>C1>C3.

The example storage system described with reference to FIG. 2A includes 8 first storage disks 206-A, 12 second storage disks 206-B and 3 third storage disks 206-C. That is, the storage system 200 includes 23 storage disks of different types. The first storage disks 206-A may include a plurality of disk slices 208-A; the second storage disks 206-B may include a plurality of disk slices 208-B and the third storage disks 206-C may include a plurality of disk slices 208-C.

In this example, considering the reliability requirement of the storage system, a storage disk set may be configured to include 25 or less storage disks. Consequently, in a case that 3 first storage disks 206-A and 1 third storage disk 206-C are newly added, the storage system 200 shall include 27 storage disks in total. Since the number of storage disks exceed the number that is allowed in one storage disk set (i.e., 25), the 27 storage disks will be reallocated to determine two new storage disk sets.

The above examples are provided only for explaining the present disclosure, rather than being a limitation. In other examples, the size of the storage disks, the corresponding number of the storage disks and the number of storage disks allowed in the storage disk set may be set according to actual needs.

Generally, it is expected that the allocated storage disk sets have a large total effective capacity. The effective capacity refers to the capacity of storage disks that can be used for providing available disk slices to disk slice sets. However, in different allocation options, the total effective capacity of storage disk sets may vary as the storage disks may have different capacities.

For the purpose of reliability, certain reserved capacity should be reserved in the storage disk set. In this way, the disk slice sets in the storage disk set can continue to serve Input/Output (I/O) operations and can still have a RAID algorithm to protect user data, in a case that there is a failed disk (e.g., one failed disk, or one or more failed disk slices) in the storage disk set and the data in the storage disk set are to be rebuilt, In some examples, the reserved capacity equals to a capacity of a storage disk having a largest effective capacity in the storage disk set. Therefore, a number of storage disks corresponding to the number of disks in one disk array should at least be included in order to construct the storage disk set. For example, in the RAID with the disk array width of 4+1, 4 storage disks storing data, 1 storage disk storing parity data and one reserved disk, i.e., at least 6 storage disks are required for creating a storage disk set (e.g., RRS). In other examples, any other reserved capacity may be set according to actual needs.

Furthermore, since the capacities of the storage disks in the same storage disk set may differ from one another, some disk slices in some disks cannot be used for storage service, which will be explained in detail hereinafter with reference to FIGS. 2B and 2C.

Figure 2B:
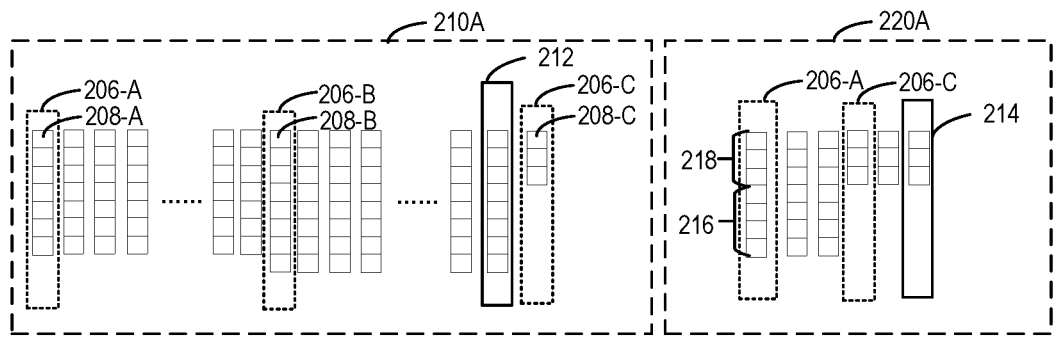
FIGS. 2B and 2C respectively illustrate two example storage disk allocations.
Figure 2C:
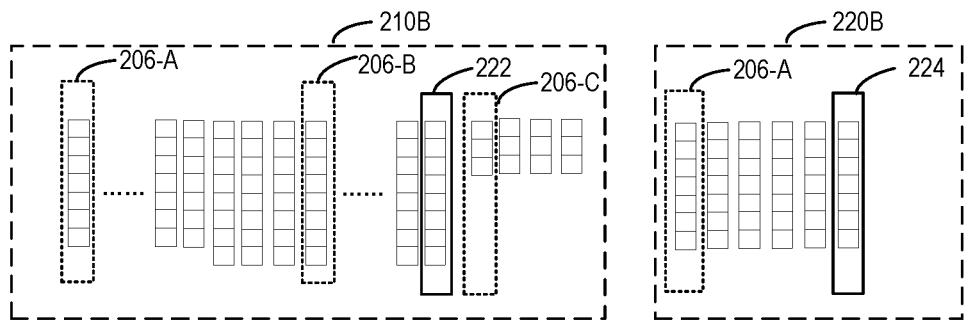

FIGS. 2B and 2C illustrate two examples of the storage disk set, respectively, obtained by allocating the storage disks in the storage system described above with reference to FIG. 2A. The two examples may be obtained by using a conventional allocation method, e.g., a random allocation.

In the example of allocation shown by FIG. 2B, in the storage system 240 where the allocation has been performed, a first storage disk set 210A includes 8 first storage disks 206-A, 12 second storage disks 206-B and 1 third storage disk 206-C, while a second storage disk set 220A includes 3 first storage disks 206-A and 3 third storage disks 206-C. The first storage disks 206-A may include a plurality of disk slices 208-A, the second storage disks 206-B may include a plurality of disk slices 208-B and the third storage disks 206-C may include a plurality of disk slices 208-C.

In a further example allocation shown by FIG. 2C, in the storage system 280 where the allocation has been performed, a first storage disk set 210B includes 5 first storage disks 206-A, 12 second storage disks 206-B and 4 third storage disks 206-C, while a second storage disk set 220B includes 6 first storage disks 206-A. The storage systems 240 and 280 in the two allocation examples have different total effective capacities. This will be explained in the following text.

Now referring to FIG. 2B, the second storage disk set 220A has 6 storage disks in total, i.e., 3 first storage disks 206-A and 3 third storage disks 206-C, where each of the first storage disks 206-A may be regarded as containing a first portion 216 and a second portion 218 while each of the third storage disks 206-C may be regarded as containing a second portion 218.

In this example, there are 6 disks having the second portion 218 in the second storage disk set 220A, and thus the second portions 218 may be used for providing available disk slices to a disk slice set. However, there are merely 3 disks having the first portion 216 in the second storage disk set 220A. The first portions of the 3 first storage disks 206-A cannot be used for providing available disk slices to the disk slice sets as the disk number is insufficient (i.e., 3, which is less than 6), thereby causing a waste of physical storage capacity in these portions of the storage disk(s).

In other words, the three storage disks 206-A of the second storage disk set 220A each have a waste capacity (having a size corresponding to the first portion 216) and the first portion 216 includes some disk slices 208-A which cannot be used for providing available storage service. As can be seen from FIG. 2B, a disk, which has the largest effective capacity in the storage disk set 220A, has a capacity equal to C3, and accordingly the reserved capacity may be defined as C3. For the purpose of illustration, the reserved capacity is identified by box 214 in FIG. 2B.

Both the reserved capacity and the waste capacity cannot be used for providing available disk slices, and the two capacities may be considered as an unavailable capacity in the storage disk set.

In view of this, the total physical capacity of 6 storage disks in the second storage disk set 220A of FIG. 2B equals to $3*C3+3*C1$, and the total physical capacity after removing the waste capacity is $6*C3$. The final total effective capacity that can be used for providing available disk slices to the disk slice set is equal to $5*C3$ after further removing the reserved capacity C3. Therefore, the unavailable capacity of the storage disk set 220A is $3*C1-2*C3$.

In the first storage disk set 210A of FIG. 2B, because the number of disks corresponding to respective portions of the storage disks is larger than 6, there is no waste capacity and the unavailable capacity of the storage disk set 220A is C2, i.e., equal to the reserved capacity. For the purpose of illustration, the reserved capacity is identified by box 212 in FIG. 2B.

Hence, the unavailable capacity of the storage system 240 is a sum of the unavailable capacity of the storage disk set 220A and the unavailable capacity of the storage disk set 220B, i.e., $3*C1-2*C3+C2$.

Likewise, in the allocated storage system 280 of FIG. 2C, the first storage disk set 210B has no waste capacity and its reserved capacity is C2 (marked by box 222 in FIG. 2C). The second storage disk set 220B has no waste capacity and its reserved capacity is C1 (marked by box 224 in FIG. 2C). Accordingly, the unavailable capacity of the storage system 280 is $C1+C2$.

In other words, in the allocated storage disk sets, an unavailable capacity of a set (group) of storage disks includes at least the reserved capacity. As different storage disks with various capacities, optionally, the unavailable capacity of the set (group) of the storage disks may further includes waste capacities of one or more storage disks.

As can be seen from the examples of FIGS. 2B and 2C, different allocation options for the storage disk sets obtained by the random allocation, may for example correspond to various unavailable capacities. Therefore, a comparison between unavailable capacities of the storage system of the different allocation options for the storage disk sets may be performed in order to determine final optimized storage disk sets.

FIGS. 2B and 2C are merely two examples of allocation options, and there may be various other allocation options. For example, a solution space including all possible allocation options of storage disk sets is traversed by using a backtracking algorithm to obtain the allocation options such as the allocations of the storage disk sets shown in FIGS. 2B and 2C. An optimized allocation option is then found from all allocation options.

However, in the example of FIG. 2A, there are 27 storage disks to be allocated in total and the storage disks are expected to be allocated into two sets of storage disks. Each storage disk may have two allocation choices, i.e., being allocated to the first storage disk set or to the second storage disk set. In such manner, a total of $2^{27}$ solutions in the solution space for the allocation options of the storage disks are required to be traversed to find the optimized allocation option. Therefore, using the backtracking method for allocating the storage disks is complicated and time-consuming and may cause large computing overheads, especially in a case where new storage disks are added into the storage system frequently and thus an update for the allocation of the storage disk sets should be performed frequently.

Embodiments of the present disclosure provide a method for allocating a plurality of storage disks as shown in FIG. 2A to form a storage disk set. In this method, a plurality of storage disk groups is determined from a plurality of storage disks. A storage disk group with low unavailable capacity is determined from the plurality of storage disk groups, and consequently the storage disk set is constructed on the basis of the selected storage disk groups. The storage disk set (such as RRS) can be obtained quickly according to this method.

A process of a method of allocating storage disks is described in details below with reference to FIGS. 3 to 7. To facilitate understanding, the specific data mentioned in the following text are merely by way of example and are not intended to limit the protection scope of the present disclosure.

Figure 3:
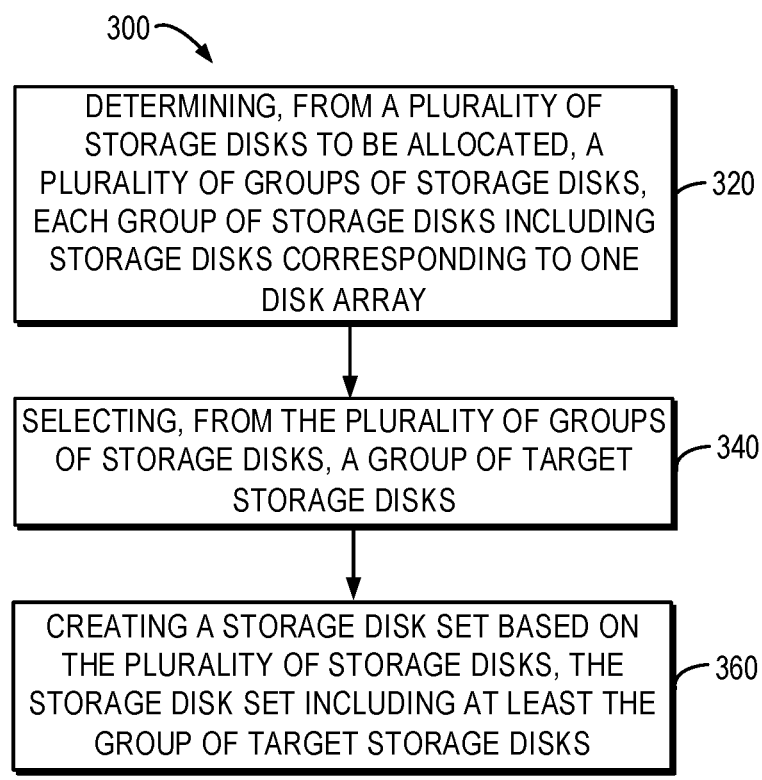
FIG. 3 illustrates a flowchart of a process of allocating storage disks in accordance with embodiments of the present disclosure.

FIG. 3 illustrates a flowchart of a process or method 300 of allocating storage disks in accordance with embodiments of the present disclosure. In some embodiments, the method 300 may be implemented in the allocation device 120 shown in FIG. 1 and/or other devices having similar capabilities. The method 300 in accordance with embodiments of the present disclosure is now described with reference to FIG. 2B.

At 320, the allocation device 102 determines, from a plurality of (e.g., N) storage disks to be allocated, a plurality groups (e.g., M groups) of storage disks, where each group of storage disks includes storage disks corresponding to one disk array.

In some embodiments, the storage disks corresponding to one disk array indicate the number of storage disks corresponding to the RAID width. For example, if the RAID has a disk array width of 4+1=5, the storage disks corresponding to one disk array are 6 disks (i.e., RAID width+1). In some embodiments, the allocation device 102 may determine M groups of storage disks by traversing all N storage disks. A union set of the M groups of storage disks includes all N storage disks. The M groups of storage disks differ from one another. In some embodiments, the allocation device 102 may rank the plurality of storage disks according to their capacities, and then perform the above traversing process on the plurality of ranked storage disks to determine the plurality of groups of storage disks.

At 340, the allocation device 102 selects, from M groups of storage disks, a group of target storage disks which has an unavailable capacity lower than a first threshold capacity.

The first threshold capacity may be determined in many ways. In some embodiments, the allocation device 102 may calculate M unavailable capacities corresponding to the M groups of storage disks, and then determine, from the M unavailable capacities, the first threshold capacity.

In some embodiments, the allocation device 102 may iteratively compare two of the M unavailable capacities to determine a second lowest unavailable capacity in the M unavailable capacities as the first threshold capacity. Alternatively, the allocation device 102 also may determine the first threshold capacity by ranking the M unavailable capacities. The allocation device 102 may then select, from the M groups of storage disks, a group of target storage disks which has an unavailable capacity lower than the first threshold capacity.

For example, when the second lowest unavailable capacity is determined as the first threshold capacity, the selected group of target storage disks may have the lowest unavailable capacity. In this way, the allocation device 102 can select, from the plurality of groups of storage disks, the group of storage disks which has the minimum unavailable capacity (including the reserved capacity and optionally, the waste capacity as discussed above) in a short time.

In some further embodiments, the first threshold capacity may also be set in other ways. For example, the first threshold capacity may be determined according to the computing overheads of the allocation device or manually set by users. Embodiments of the present disclosure are not limited in this regard.

In some embodiments, if there are several groups of storage disks having unavailable capacities lower than the first threshold capacity, the allocation device 102 may select a group of storage disks ranking higher as the group of target disks. Alternatively, the allocation device may also select, from the several groups of storage disks, the group of target storage disks based on a capacity distribution of the plurality of storage disks, such that a distribution of remaining storage disks is advantageous to an execution of subsequent steps.

At 360, the allocation device 102 creates a storage disk set based on a plurality of storage disks, where the storage disk set includes at least the group of target storage disks.

As an optimal solution selected from all possible options of storage disk groups, the group of target storage disks have an optimized (e.g., lowest) unavailable capacity. A storage disk set, which is built by the group of target storage disks along with other storage disk(s), has an unavailable capacity approximately equal to (e.g., being equal to) the unavailable capacity of the group of target storage disks. In other words, the unavailable capacity of the storage disk set to be built depends on that of the group of target storage disks. Because the unavailable capacity of the storage disk set is associated with the total effective capacity of the storage system, the total effective capacity of the storage system can be advantageously ensured by creating the storage disk set including the group of target storage disks (e.g., which has the lowest unavailable capacity).

As discussed above, the group of target storage disks includes enough disks required for creating a disk array already. In a case that the reliability is guaranteed, the number of storage disk sets after allocation is expected to be as low as possible to lower the management complexity. In some embodiments, an upper limit (denoted as Dmax) for the number of storage disks allowed to be included in the storage disk set may be set, and the number of storage disk sets after allocation (denoted as Snum) may be determined according to the total number N of the storage disks through the following formula (1):

$$Snum = \left\lceil \frac{N}{Dmax} \right\rceil \quad (1)$$

Where ⌈ ⌉ represents rounding up the calculation result to an integer.

For the storage disk set to be created, the following conditions should be met:

$$LT=\text{Max}(Dmin, N-(Snum-1)*Dmax) \quad (2)$$

$$UT=\text{Min}(Dmax, N-(Snum-1)*Dmin) \quad (3)$$

Where Min ( ) represents taking a small value from two values and Max ( ) represents taking a large value from the two values; Dmin represents the number of storage disks corresponding to the RAID width (such as the storage disks corresponding to one disk array); LT represents a lower limit of the number of storage disks that should be included in the storage disk set to be created; and UT represents an upper limit of the number of storage disks that is allowed to be included in the storage disk set to be created. That is, the above formulas (2) and (3) define a range for the number of storage disks that can be included in the storage disk set to be created.

A first number indicative of storage disks that are allowed to be included in the storage disk set may be determined by the above formulas (1) to (3). It should be noted that the allocation device may perform the above step of calculating the range for the number of storage disks at any suitable time instant, for example, before the step 320.

In one example, assuming that there are 60 storage disks to be allocated, Dmax is defined as 25 for the RAID 5 with the disk array width of 4+1 (i.e., Dmin=6). The allocation device 102 may calculate Snum to be 3 according to the formula (1), LT to be 10 according to the formula (2) and UT to be 25 according to the formula (3). In other words, the range R for the number of storage disks to be included in the storage disk set to be created is 10≤R≤25.

The above examples are merely provided for the purpose of illustration, and embodiments are not limited in this regard. Other disk array types, disk array widths and upper limits Dmax of the number of storage disks that can be included in the storage disk set may be adopted as long as they are appropriate based on actual requirements.

In some embodiments, the storage disk set may also include further storage disk(s) in addition to the group of target storage disks, as long as the number of disks in the storage disk set is within the above range for the number of storage disks. Therefore, the allocation device 102 may select, from a plurality of storage disks based on the first number, a group of additional storage disk(s) that is different from the group of target storage disks. Each storage disk in the group of additional storage disk(s) has a capacity smaller than or equal to the capacity of each storage disk in the group of target storage disks. In a case that the storage disk(s) having a lower capacity is added into the group of target storage disks, the unavailable capacity of the entire storage disk set will not be not affected. For example, referring back to FIG. 2B, when 3 further disks 206-C are added into the second storage disk set 220A, the unavailable capacity of a new second storage disk set 220A remains unchanged, i.e., 3*C1−2*C3.

In some embodiments, after a storage disk set has been created, the allocation device 102 may further determine whether the allocation should be performed for the remaining storage disks. In response to a positive determination, the allocation device 102 may continue to perform the process in 300 to construct further storage disk sets. In response to a negative determination, the allocation device 102 may directly take the remaining storage disks as a further storage disk set. This determination may be made, for example, on the basis of the formula (1). In this way, the allocation device 102 can determine an optimized storage disk set each time the process in 300 is performed.

In some other embodiments, in response to a detection means (e.g., provided by the allocation device 102 in FIG. 1, or by a component in the storage system 104) detecting a change in the number of storage disks in the storage system, the allocation device 102 may re-execute the process in 300 to determine a plurality of updated storage disk sets.

In some further embodiments, whether multiple storage disks to be allocated are the same in capacity may be determined. In response to a determination of the same, the allocation device 102 may directly determine a plurality of storage disk sets in accordance with Dmin and Dmax. It should be noted that the process of detecting capacities may be performed in any allocation process.

By implementing the allocation process in units of storage disk groups as described above, the allocation device can find an allocation option with the optimized unavailable capacity from a small solution space including the allocation options, such that the storage disk set(s) with the optimized available capacity can be found through less computing overheads. Moreover, the determined storage disk set(s) may not affect the subsequent process of creating one or more further storage disk sets. The one or more further storage disk sets with the optimized available capacity may be created, from the remaining storage disks, by performed the allocation process again.

Figure 4:
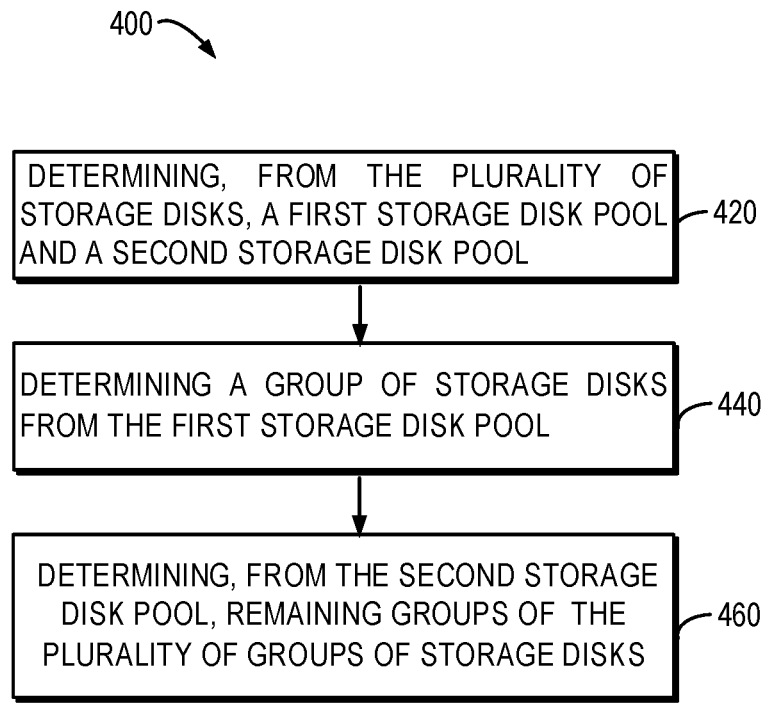
FIG. 4 illustrates a flowchart of a process of determining multiple groups of storage disks in accordance with embodiments of the present disclosure.

FIG. 4 illustrates a flowchart of a process or method 400 for determining a plurality of groups of storage disks in accordance with embodiments of the present disclosure. Specifically, FIG. 4 describes 320 of FIG. 3 in detail. In some embodiments, the method 400 may be implemented in the allocation device 102 of FIG. 1 and/or other devices having similar capabilities. The process or method 400 for selecting target groups in accordance with embodiments of the present disclosure is now described with reference to FIG. 5. For a better understanding, the specific data mentioned herein are merely by way of example and are not intended to limit the protection scope of the present disclosure.

At 420, the allocation device 102 determines, from the plurality of storage disks, a first storage disk pool and a second storage disk pool.

In some embodiments, each storage disk contained in the first storage disk pool has a capacity smaller than or equal to a second threshold capacity, and each storage disk contained in the second storage disk pool has a capacity larger than the second threshold capacity. In one example, the allocation device 102 may select the second threshold capacity, such that the number of storage disks included in the first storage pool is equal to LT determined from the above formula (2).

Figure 5:
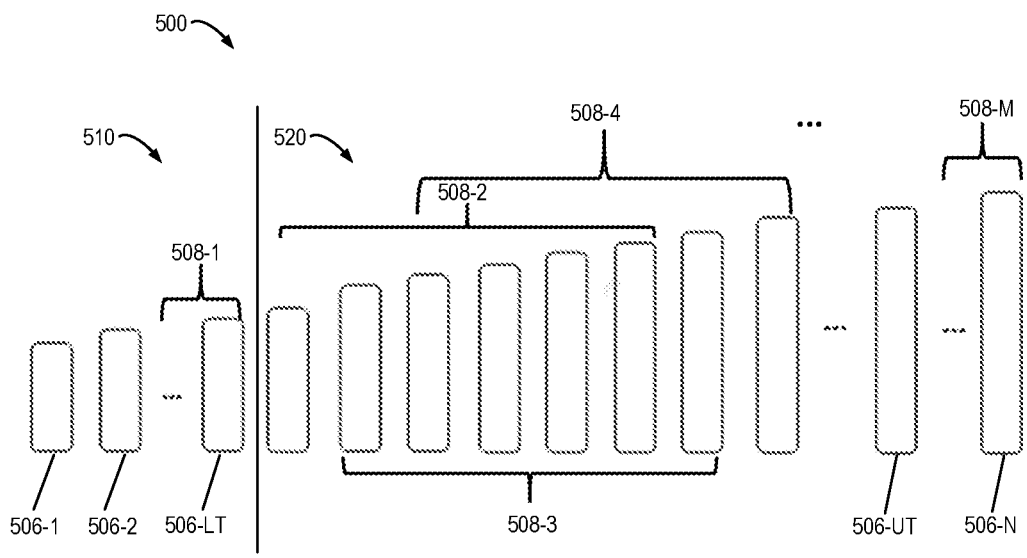
FIG. 5 illustrates a schematic diagram of determining a candidate group of storage disks in accordance with one embodiment of the present disclosure.

In some embodiments, the allocation device 102 may sort the plurality of storage 1 by capacity, and then determine the first storage disk pool and the second storage disk pool as shown in FIG. 5. FIG. 5 illustrates a schematic diagram of determining candidate groups of storage disks from a storage system 500 including a first storage disk pool 510 and a second storage disk pool 520. In an example, a plurality of storage disks 506-1 to 506-N in the storage system 500 may be sorted in an ascending order by their capacities. In FIG. 5, each stripe corresponds to a storage disk in disk 506-1 to 506-N, while a length of the stripe may represent a capacity corresponding to the storage disk. Accordingly, 506-1 to 506-N each may also indicate a capacity ranking of the corresponding storage disk. In this way, the allocation device 102 can simply determine the first storage disk pool 510 and the second storage disk pool 520. For example, the allocation device 102 may determine, according to the ranking, storage disk(s) at the left side of a storage disk 506-LT (e.g., LT may be determined from formulas (1)-(3)), i.e., all storage disks having smaller capacity as the first storage disk pool 510, and determine the remaining storage disks as the second storage disk pool 520.

Referring back to FIG. 4, at 440, the allocation device 102 determines, from the first storage disk pool, one group of storage disks for the plurality of groups of storage disks.

In some embodiments, the allocation device 102 may select, according to the capacities of the storage disks in the first storage disk pool, storage disks having top largest capacities and corresponding to a disk array (e.g., top 6 storage disks may be selected for RAID 5 with an array width of 4+1) as the one group of storage disks.

Referring to FIG. 5 again, in an example, for the RAID 5 with the array width of 4+1, the allocation device 102 may simply select, from the first storage disk pool with disks sorted in an ascending order, a group of storage disks 508-1 containing the storage disk 506-LT and 5 adjacent disks on the left side of the storage disk 506-LT (i.e., 506-(LT-5) to 506-LT). Therefore, the unavailable capacity of only one group of storage disks should be calculated in the first storage disk pool.

In some embodiments, the allocation device 102 may construct the storage disk set using all storage disks in the first storage disk pool, in a case that it determines that the group of storage disks is the group of target storage disks. With reference to FIG. 5, in an example, if the allocation device 102 determines that the disk group 508-1 is the group of target storage disks, the storage disk set may be built by including all disks 506-1 to 506-LT.

Referring back to FIG. 4, the allocation device 102 determines, from the second storage disk pool, remaining groups of storage disks in the plurality of groups of storage disks other than the determined group of storage disks at 460.

In some embodiments, with reference to FIG. 5, the allocation device 102 may determine the remaining groups of storage disks 508-2, 508-3, 508-4 to 508-M by selecting multiple (e.g., selecting 6 storage disks for RAID 5 with the array width of 4+1) adjacent storage disks from the second storage disk pool 520 in which the disks have been ranked by capacities. A union set of the remaining groups of storage disks 508-2 to 508-M should include all storage disks in the second storage disk pool. In this way, in the second storage pool, the number of times of calculating the unavailable capacities that should be performed by the allocation device 102 may be further reduced.

By implementing the above allocation process based on storage disk pools, the number of groups of storage disks may be further reduced, thereby further reducing the computing overheads. In this way, the number of determined groups of storage disks may reach an order as the total number of storage disks. For example, for the RAID 5 with the array width of 4+1, the number of groups M of storage disks determined in the manner shown by FIG. 5 is equal to N−LT−4, and the time complexity of the allocation process may be lowered to an order of $N^2$. Therefore, the number of times for calculating the unavailable capacities, the corresponding number of times for comparing the unavailable capacities and ultimately the calculation time and calculation overheads required for determining the group of target storage disks may be further reduced.

It should be noted that blocks 440 and 460 may be executed in any order, or in parallel.

Figure 6:
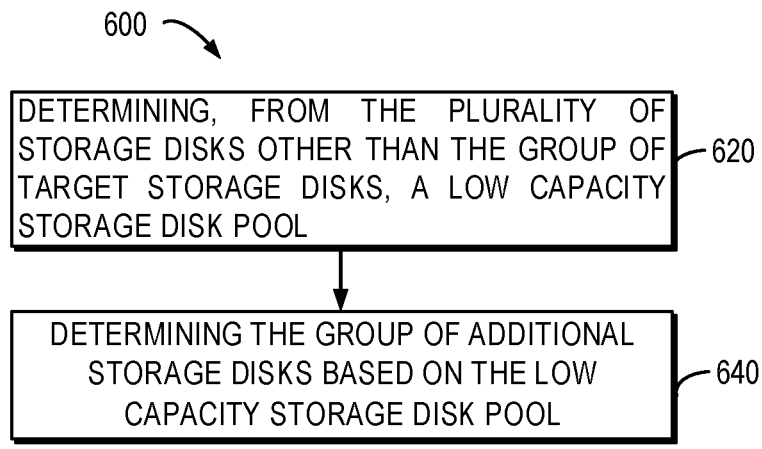
FIG. 6 illustrates a flowchart of a process for determining a group of additional storage disks in accordance with embodiments of the present disclosure.

FIG. 6 illustrates a flowchart of a process or method 600 of determining a group of additional storage disks in accordance with embodiments of the present disclosure. Specifically, FIG. 6 describes details of block 360 in FIG. 3. In some embodiments, the method 600 may be implemented in the allocation device of FIG. 1 and/or other devices having similar capabilities. The method or process 600 of selecting the group of additional storage disks in accordance with embodiments of the present disclosure is described now with reference to FIGS. 7A and 7B. The group of additional storage disks may be used for creating the storage disk set together with the group of target storage disks as described earlier. The specific data mentioned herein are by way of example for a better understanding, and are not intended to limit the protection scope of the present disclosure.

At 620, the allocation device 102 determines a low capacity storage disk pool from the plurality of storage disks other than the group of target storage disks.

In some embodiments, each of the storage disks in the low capacity storage disk pool has a capacity smaller than or equal to the capacity of each of the storage disks in the group of target storage disks. As discussed above, if a storage disk having a lower capacity is added into the group of target storage disks, the overall unavailable capacity of the storage disk set will not be affected. In the case that the group of additional storage disks is created by selecting storage disks from the low capacity storage disk pool, the unavailable capacity of the storage disk set to be created may be unchanged.

Figure 7A:
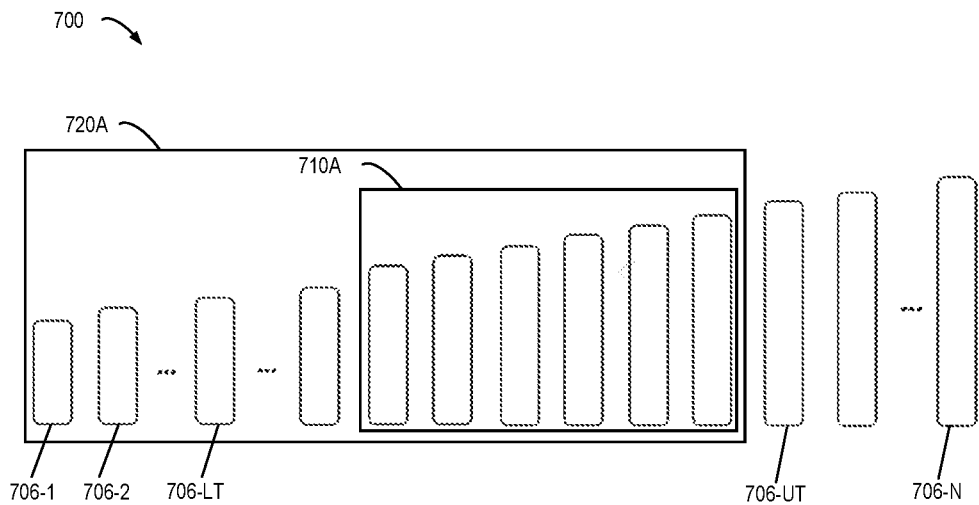
FIGS. 7A and 7B illustrate schematic diagrams of determining a group of additional storage disks based on a low capacity storage disk pool in accordance with embodiments of the present disclosure, respectively.
Figure 7B:
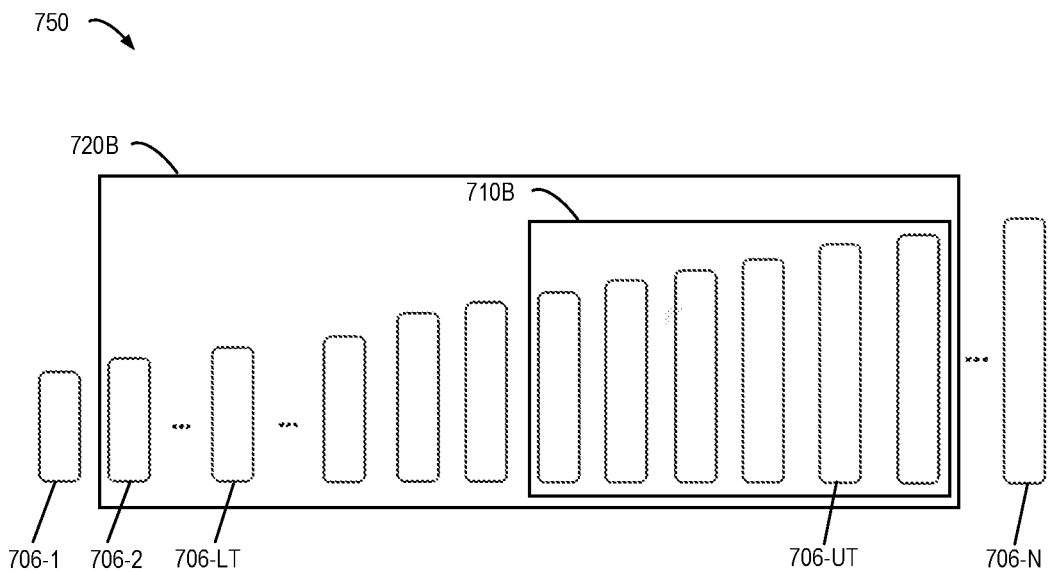

In some embodiments, the allocation device 102 may perform a ranking operation on the plurality of storage disks according to capacities thereof, and then determine the low capacity storage disk pool. FIGS. 7A and 7B illustrate schematic diagrams of determining the group of additional storage disks based on the low capacity storage disk pool in accordance with embodiments of the present disclosure. In an example, with reference to FIGS. 7A and 7B, the allocation device 102 may sort storage disks 706-1 to 706-N in storage systems 700 or 750 in an ascending order by capacities, such that the allocation device 102 may simply determine the low capacity storage disk pool after the determination of the group of target storage disks 710A or 710B. For example, (e.g., all) storage disk(s) at the left side of 710A or 710B (i.e., having smaller capacity) may be included in the low capacity storage disk pool.

Referring back to FIG. 6, at 640, the group of additional storage disks is determined based on the low capacity storage disk pool.

The low capacity storage disk pool may also contain a large number of storage disks. As discussed above, the first threshold number UT of the storage disks allowed to be included in the storage disk set may be determined from the above formulas (1) to (3). Accordingly, the allocation device 102 may select some storage disks from the low capacity storage disk pool, such that the number of storage disks in the storage disk set satisfies the first number.

In some embodiments, in a case that the number of storage disks in the low capacity storage disk pool is smaller than or equal to a second threshold number, it is determined that the group of additional storage disks include all storage disks in the low capacity storage disk pool. The second threshold number is determined based on the number of storage disks in the group of target storage disks and the first number. In other words, even though all disks in the low capacity storage disk pool are added into the storage disk set, the total number in the storage disk set still falls within the range determined from the formulas (1) to (3), i.e., smaller than or equal to the first threshold number.

In this case, all disks in the low capacity storage disk pool may be directly added into the group of additional storage disks that is to be used for creating the storage disk set. Now referring to FIG. 7A, the allocation device 102 determines a group 710A as the group of target storage disks, and determines all storage disks at the left side of the group 710A (each of which has a smaller capacity) as the low capacity storage disk pool. As can be seen from this figure, even if all storage disks in the low capacity storage disk pool are added, the number of storage disks in the storage disk set 720A to be built still satisfies (e.g., is smaller than) the first threshold number UT. Namely, the storage disk set 720A is at the left side of the disk 706-UT. In such case, all storage disks in the low capacity storage disk pool, together with one group of target storage disks 710A, may be used for creating the storage disk set 720A.

In some embodiments, in a case that the number of storage disks in the low capacity storage disk pool is larger than the second threshold number, the allocation device 102 needs to select some storage disks from the low capacity storage disk pool as the group of additional storage disks, such that the number of storage disks in the storage disk set to be built may satisfy the first number. In other words, in this case, if all disks in the low capacity storage disk pool are directly added into the storage disk set, the total number in the storage disk set will exceed the first threshold number UT. Therefore, only some storage disks are selected from the low capacity storage disk pool as the group of additional storage disks that is to be used for creating the storage disk set.

In general, except for the selected group of additional storage disks, other storage disks having lower capacities remain in a to-be-allocated state, while these other storage disks having lower capacities will not affect a subsequent process of creating one or more further storage disk sets. In some embodiments, storage disk(s) with lowest capacity may be removed from the low capacity storage disk pool, since they may have nearly no influence on the unavailable capacities of the one or more further storage disk sets to be constructed.

Now referring to FIG. 7B, the group 710B is determined as the group of target storage disks, and all storage disks at the left side of 710B (i.e., each of which has a smaller capacity) are included in the low capacity storage disk pool. As can be seen from this figure, if all storage disks in the low capacity storage disk pool are added, the number of storage disks in the storage disk set 720A to be constructed will exceed the first threshold number. At this point, the group of additional storage disks should be selected from the storage disks in the low capacity storage disk pool. For example, the remaining storage disks with the smallest capacity other than the storage disk 706-1 are selected as the group of additional storage disks. In such case, the storage disk set, which is created by using the group of additional storage disks and the group of target storage disks, includes the storage disks 706-2 to 706-UT. In other embodiments, for example, 6 or even more storage disks with the smallest capacity may be removed from the low capacity storage disk pool to construct the group of additional storage disks, as long as the storage disk set that is ultimately constructed by the group of additional storage disks has the number of disks satisfying the first number. Alternatively, the group of additional storage disks may be determined by randomly selecting some storage disks from the low capacity storage disk pool, as long as the remaining, unselected storage disk(s) do not affect the subsequent allocation.

By implementing the above allocation process based on the low capacity storage disk pool, storage disk sets having optimized total capacities can be determined. The number of storage disks in the storage disk set can meet the requirements, while a subsequent allocation for the remaining storage disks will not be affected.

Hereinafter, two example implementations of allocation results obtained in accordance with embodiments of the present disclosure are described.

In a first example implementation, there are 10 disks each having 100 disk slices (type 1), 10 disks each having 200 disk slices (type 2) and 10 disks each having 300 disk slices (type 3) in a storage system to be allocated. For the RAID 5 with the disk array width of 4+1 and to meet the upper limit Dmax indicative of the number of storage disks allowed to be included the storage disk set, two sets of storage disks (RRS0 and RRS1) should be constructed in the storage system. The number of storage disks in the storage disk set to be constructed ranges from 6 to 24.

An allocation result by using the method in accordance with embodiments of the present disclosure is shown in Table 1:

TABLE 1

| RRS | Allocation Result |
|---|---|
| 0 | 6 disks of type 1 |
| 1 | 4 disks of type 1, 10 disks of type 2 and 10 disks of type 3 |

For the first storage disk set RRS0, the reserved capacity is 100 disk slices and the waste capacity is 0, and thus the unavailable capacity is 100 disk slices. For the second storage disk set RRS1, the reserved capacity is 300 disk slices and the waste capacity is 0. The whole unavailable capacity of the storage system is 400 disk slices. The allocation result shown in Table 1 is one of the allocation options with optimized unavailable capacity.

In a second example implementation, there are 4 disks each having 100 disk slices (type 1), 4 disks each having 200 disk slices (type 2), 4 disks each having 300 disk slices (type 3) and 10 disks each having 400 disk slices (type 4) and 5 disks each having 500 disk slices (type 5) in a storage system to be allocated. Similarly, for the RAID 5 with the disk array width of 4+1 and to meet the upper limit Dmax indicative of the number of storage disks allowed to be included the storage disk set, two sets of storage disks (RRS0 and RRS1) are required to be constructed in the storage system. The number of storage disks in the storage disk set to be constructed ranges from 6 to 21.

An allocation result by using the method in accordance with embodiments of the present disclosure is shown in Table 2:

TABLE 2

| RRS | Allocation Result |
|---|---|
| 0 | 4 disks of type 1, 4 disks of type 2, 4 disks of type 3 and 6 disks of type 4 |
| 1 | 4 disks of type 4 and 5 disks of type 5 |

For RRS0, the reserved capacity is 400 disk slices and the waste capacity is 0, and thus the unavailable capacity is 400 disk slices. For RRS1, the reserved capacity is 400 disk slices and the waste capacity is 500 disk slices, and thus the unavailable capacity is 900 disk slices. Accordingly, the whole unavailable capacity of the storage system is 1300 disk slices. The allocation result shown in Table 2 is one of the allocation options with optimized unavailable capacity.

Figure 8:
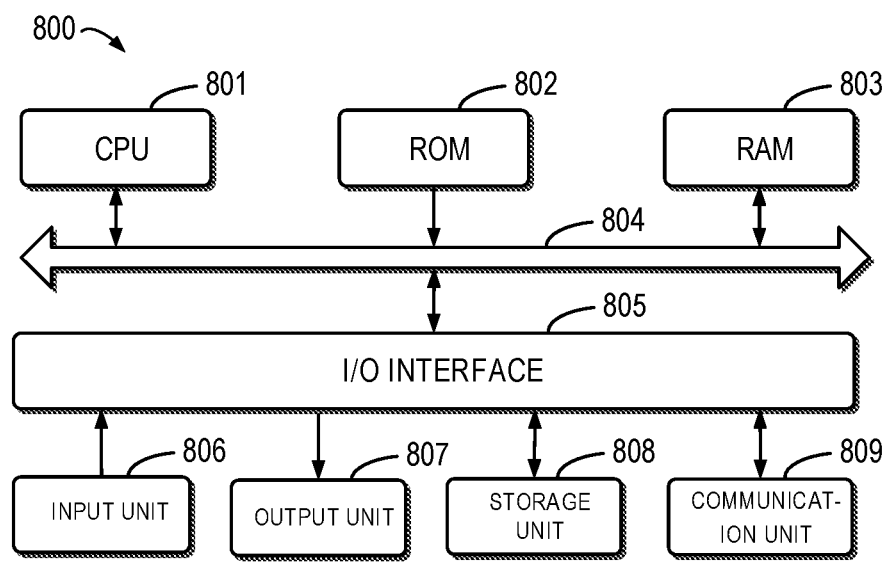
FIG. 8 illustrates a block diagram of an example device for implementing embodiments of the present disclosure.

FIG. 8 illustrates a schematic block diagram of an example electronic device 800 which may be used for implementing embodiments of the present disclosure. For example, the electronic device 800 may be used for implementing the allocation device 102 of FIG. 1. As shown, the device 800 includes a central processing unit (CPU) 801, which can execute various suitable actions and processing based on the computer program instructions stored in the read-only memory (ROM) 802 or computer program instructions loaded onto the random-access memory (RAM) 803 from a storage unit 808. The RAM 803 may also store all kinds of programs and data required by the operations of the device 800. CPU 801, ROM 802 and RAM 803 are connected to each other via a bus 804. The input/output (I/O) interface 805 is also connected to the bus 804.

A plurality of components in the device 800 is connected to the I/O interface 805, including: an input unit 806, such as keyboard, mouse and the like; an output unit 807, e.g., various kinds of display and loudspeakers etc.; a storage unit 808, such as magnetic disk, optical disk etc.; and a communication unit 809, such as network card, modem, wireless transceiver and the like. The communication unit 809 allows the device 800 to exchange information/data with other devices via the computer network, such as Internet, and/or various telecommunication networks.

Various processes and processing described above, such as any of the processes 300, 400 and 600, may be performed by the processing unit 801. For example, in some embodiments, any of the processes 300, 400 and 600 may be implemented as a computer software program or a computer program product tangibly embodied on a machine-readable medium, such as the storage unit 808. In some embodiments, a part of or the entire computer program can be loaded and/or mounted onto the device 800 via the ROM 802 and/or the communication unit 809. When the computer program is loaded to the RAM 803 and executed by the CPU 801, one or more acts of any of the processes 300, 400 and 600 can be performed. Alternatively, in other embodiments, the CPU 801 can be configured to execute any of the processes 300, 400 and 600 in any other suitable manners (e.g., by means of firmware).

The present disclosure may be a method, an apparatus, a system and/or a computer program product. The computer program product can include a computer-readable storage medium on which computer-readable program instructions can be executed for implementing aspects of the present disclosure.

The computer-readable storage medium may be a tangible apparatus that maintains and stores instructions utilized by an instruction executing device. The computer-readable storage medium may be, but not limited to, electronic storage device, magnetic storage device, optical storage device, electromagnetic storage device, semiconductor storage device or any suitable combinations of the above. More specific examples of the computer-readable storage medium may include but are not limited to: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punch card or in-slot-projection with instructions stored thereon, and any suitable combinations of the above. The computer-readable storage medium utilized here is not interpreted as transitory signals per se, such as radio waves or other freely propagated electromagnetic waves, electromagnetic waves propagated via a waveguide or other transmission media (such as optical pulses via fiber-optic cable), or electric signals propagated via a wire.

The computer-readable program instruction described herein may be downloaded from a computer-readable storage medium to various computing/processing devices, or to an external computer or an external storage device via a network, such as Internet, local area network, wide area network and/or wireless network. The network may include copper cable transmission, optical fiber transmission, wireless transmission, router, firewall, switch, gateway computer and/or edge server. A network adapter card or a network interface in each computing/processing device receives computer-readable program instructions from the network and forwards the computer-readable program instructions for storage in the computer-readable storage medium of respective computing/processing devices.

The computer program instructions for performing operations of the present disclosure may be assembly instructions, instructions in instruction set architecture (ISA), machine instructions, machine-related instructions, microcodes, firmware instructions, state setting data, or source codes or target codes written in any combinations of one or more programming languages, wherein the programming languages including object-oriented programming languages, such as Smalltalk, C++ and the like, and traditional procedural programming languages, such as C language or similar programming languages. The computer-readable program instructions may be executed fully on the user computer, partially on the user's computer, as a stand-alone software package, partially on the user computer and partially on the remote computer, or fully on the remote computer or server. In a case where the remote computer is involved, the remote computer may be connected to the user computer via any type of network, including a local area network (LAN) and wide area network (WAN), or to the external computer (e.g., connected via Internet using the Internet service provider). In some embodiments, an electronic circuit, such as programmable logic circuit, field programmable gate array (FPGA) or programmable logic array (PLA), may be customized by using state information of the computer-readable program instructions. The electronic circuit may execute computer-readable program instructions to implement various aspects of the present disclosure.

Each aspect of the present disclosure is disclosed here with reference to the flowchart and/or block diagram of the method, apparatus (system) and computer program product according to embodiments of the present disclosure. It should be understood that each of blocks in the flowcharts and/or block diagrams and combinations thereof may be implemented by the computer-readable program instructions.

The computer-readable program instructions may be provided to a processing unit of a general-purpose computer, a special purpose computer or other programmable data processing apparatuses to produce a machine, such that the instructions, when executed by the processing unit of the computer or other programmable data processing apparatuses, produce means (e.g., specialized circuitry) for implementing functions/actions specified in one or more of blocks in the flowcharts and/or block diagrams. The computer-readable program instructions may also be stored in the computer-readable storage medium, and the instructions cause the computer, programmable data processing apparatus and/or other devices to operate in a particular manner. Therefore, the computer-readable medium with instructions stored thereon includes an article of manufacture that includes instructions for implementing various aspects of the functions/actions specified in one or more of blocks of the flowchart and/or block diagram.

The computer-readable program instructions may also be loaded onto the computer, other programmable data processing apparatuses or other devices, so as to cause a series of operational steps to be performed on the computer, other programmable data processing apparatuses or other devices to produce a computer-implemented process, such that the instructions executed on the computer, other programmable data processing apparatuses or other devices implement the functions/acts specified in one or more of blocks in the flowcharts and/or block diagrams.

The flowchart and block diagram in the drawings illustrate the architectures, functions and operations of possible implementations of systems, methods and computer program products according to embodiments of the present disclosure. In this regard, each block in the flowchart or block diagrams may represent a module, snippet, or portion of code, which includes one or more executable instructions for performing the specified logic function(s). In some alternative implementations, the functions noted in the block may occur out of the order noted in the figures. For example, two blocks shown in succession may, in fact, be executed substantially concurrently, or the blocks may sometimes be executed in a reverse order, depending upon the functionality involved. It will also be noted that each block in the block diagrams and/or flowchart illustration, and combinations thereof may be implemented by a special purpose hardware-based system that performs the specified functions or acts, or a combination thereof.

Various implementations of the present disclosure have been described above. The above description is only illustrative rather than exhaustive, and is not limited to the implementations disclosed herein. Many modifications and alterations will be apparent to those of ordinary skill in the art without departing from the scope and spirit of the described implementations. The terminology used herein was chosen to best explain the principles of the embodiments, the practical application or technical improvements over technologies found in the marketplace, or to enable others of ordinary skill in the art to understand the embodiments disclosed herein.

In accordance with some embodiments of the present disclosure, there is provided a computer-readable medium having computer programs stored thereon, the programs, when executed by the processor, performing the method in accordance with the present disclosure.

Those skilled in the art would understand that various acts of the method of the above disclosure may be implemented via a general purpose computing device, which may be centered on a single computing device or distributed over a network composed of a plurality of computing devices. Optionally, the various acts of method may be implemented using program codes executable by a computing device, such that they may be stored in a storage device and then executed by the computing device. The various steps of the method may be embodied on respective integrated circuit modules, or a number of modules or steps thereof may be embodied on a single integrated circuit module. In this way, the present disclosure is not limited to any specific combination of hardware and software.

It should be appreciated that although several means or sub-means (e.g., specialized circuitry) of the device have been mentioned in detailed description above, such division is only illustrative. Actually, according to the embodiments of the present disclosure, features and functions of two or more means described above may be instantiated in one means. In turn, features and functions of one means described above may be further divided to be instantiated by a plurality of means.

The above disclosure are optional embodiments of the present disclosure and is not intended to limit the present disclosure. For those skilled in the art, various changes and alterations may be made to the present disclosure. Any modification, equivalent substitution, improvement and the like, within the spirit and principle of the present disclosure, fall into the protection scope of the present disclosure.

We claim:

1. A method of allocating storage disks, comprising:
determining, from a plurality of storage disks to be allocated, a plurality of groups of storage disks, each group of the plurality of groups of storage disks comprising storage disks in the plurality of storage disks corresponding to one disk array;
selecting, from the plurality of groups of storage disks, a group of target storage disks, the group of target storage disks having an unavailable capacity lower than a first threshold capacity; and
creating, based on the plurality of storage disks, a storage disk set comprising at least the group of target storage disks.

2. The method of claim 1, wherein creating the storage disk set comprises:
determining a first number of storage disks allowed to be included in the storage disk set;
selecting, from the plurality of storage disks based on the first number, a group of additional storage disks different from the group of target storage disks, each additional storage disk in the group of additional storage disks having a capacity smaller than or equal to a capacity of each storage disk in the group of target storage disks; and
creating the storage disk set based on the group of target storage disks and the group of additional storage disks.

3. The method of claim 2, wherein determining the first number comprises:
determining a second number of target storage disks in the group of target storage disks, and a total number of the plurality of storage disks; and determining, based on the second number and the total number, the first number of storage disks allowed to be included in the storage disk set, the first number being smaller than or equal to a first threshold number.

4. The method of claim 2, wherein selecting the group of additional storage disks comprises:
determining a low capacity storage disk pool from storage disks of the plurality of storage disks other than the group of target storage disks, each storage disk in the low capacity storage disk pool having a capacity smaller than or equal to a capacity of each target storage disk in the group of target storage disks; and
determining the group of additional storage disks based on the low capacity storage disk pool.

5. The method of claim 4, wherein determining the group of additional storage disks based on the low capacity storage disk pool comprises:
in accordance with a determination that a third number is smaller than or equal to a second threshold number, determining that the group of additional storage disks comprises all storage disks in the low capacity storage disk pool, the second threshold number being determined based on a second number and the first number, the second number being the number of target storage disks in the group of target storage disks and the third number being the number of storage disks in the low capacity storage disk pool; and
in accordance with a determination that the third number is larger than the second threshold number, selecting the group of additional storage disks from the low capacity storage disk pool, such that the number of storage disks in the storage disk set satisfies the first number.

6. The method of claim 1, wherein determining the plurality of groups of storage disks comprises:
ranking the plurality of storage disks according to a capacity of each of the plurality of storage disks; and
determining the plurality of groups of storage disks from the plurality of ranked storage disks.

7. The method of claim 1, wherein determining the plurality of groups of storage disks comprises:
determining, from the plurality of storage disks, a first storage disk pool and a second storage disk pool, each storage disk in the first storage disk pool having a capacity smaller than or equal to a second threshold capacity, and each storage disk in the second storage disk pool having a capacity larger than the second threshold capacity;
determining, from the first storage disk pool, a group of the plurality of groups of storage disks; and
determining, from the second storage disk pool, remaining groups of the plurality of groups of storage disks.

8. The method of claim 7, wherein determining the group of the plurality of groups of storage disks comprises:
selecting, based on capacities of storage disks in the first storage disk pool, a second number of storage disks as the group of the plurality of groups of storage disks, the second number being the number of storage disks in the group of target storage disks.

9. The method of claim 7, wherein determining the remaining groups of the plurality of groups of storage disks comprises:
ranking storage disks in the second storage disk pool according to capacities of storage disks in the second storage disk pool; and
determining the remaining groups of the plurality of groups of storage disks by selecting the second number of adjacent storage disks from the ranked storage disks in the second storage disk pool.

10. The method of claim 1, wherein selecting the group of target storage disks comprises:
calculating respective unavailable capacities of the plurality of groups of storage disks;
determining the first threshold capacity based on the calculated unavailable capacities; and
selecting, from the plurality of groups of storage disks, the group of target storage disks having an unavailable capacity lower than the first threshold capacity.

11. An electronic device, comprising:
a processor; and
a memory coupled to the processor, the memory comprising instructions stored thereon, wherein the instructions, when executed by the processor, cause the electronic device to perform acts comprising:
determining, from a plurality of storage disks to be allocated, a plurality of groups of storage disks, each group of the plurality of groups of storage disks comprising storage disks in the plurality of storage disks corresponding to one disk array;
selecting, from the plurality of groups of storage disks, a group of target storage disks, the group of target storage disks having an unavailable capacity lower than a first threshold capacity; and
creating, based on the plurality of storage disks, a storage disk set comprising at least the group of target storage disks.

12. The device of claim 11, wherein creating the storage disk set comprises:
determining a first number of storage disks allowed to be included in the storage disk set;
selecting, from the plurality of storage disks based on the first number, a group of additional storage disks different from the group of target storage disks, each additional storage disk in the group of additional storage disks having a capacity smaller than or equal to a capacity of each storage disk in the group of target storage disks; and
creating the storage disk set based on the group of target storage disks and the group of additional storage disks.

13. The device of claim 12, wherein determining the first number comprises:
determining a second number of target storage disks in the group of target storage disks, and a total number of the plurality of storage disks; and
determining, based on the second number and the total number, the first number of storage disks allowed to be included in the storage disk set, the first number being smaller than or equal to a first threshold number.

14. The device of claim 12, wherein selecting the group of additional storage disks comprises:
determining a low capacity storage disk pool from storage disks of the plurality of storage disks other than the group of target storage disks, each storage disk in the low capacity storage disk pool having a capacity smaller than or equal to a capacity of each target storage disk in the group of target storage disks; and
determining the group of additional storage disks based on the low capacity storage disk pool.

15. The device of claim 14, wherein determining the group of additional storage disks based on the low capacity storage disk pool comprises:
in accordance with a determination that a third number is smaller than or equal to a second threshold number, determining that the group of additional storage disks comprises all storage disks in the low capacity storage disk pool, the second threshold number being determined based on a second number and the first number, the second number being the number of target storage disks in the group of target storage disks and the third number being the number of storage disks in the low capacity storage disk pool; and in accordance with a determination that the third number is larger than the second threshold number, selecting the group of additional storage disks from the low capacity storage disk pool, such that the number of storage disks in the storage disk set satisfies the first number.

16. The device of claim 11, wherein determining the plurality of groups of storage disks comprises:

ranking the plurality of storage disks according to a capacity of each of the plurality of storage disks; and determining, from the plurality of storage disks on which the ranking has been performed, the plurality of groups of storage disks.

17. The device of claim 11, wherein determining the plurality of groups of storage disks comprises:

determining, from the plurality of storage disks, a first storage disk pool and a second storage disk pool, each storage disk in the first storage disk pool having a capacity smaller than or equal to a second threshold capacity, and each storage disk in the second storage disk pool having a capacity larger than the second threshold capacity;

determining, from the first storage disk pool, a group of the plurality of groups of storage disks; and determining, from the second storage disk pool, remaining groups of the plurality of groups of storage disks.

18. The device of claim 17, wherein determining the group of storage disks in the plurality of groups of storage disks comprises:

selecting, based on capacities of storage disks in the first storage disk pool, a second number of storage disks as the group of the plurality of groups of storage disks, the second number being the number of storage disks in the group of target storage disks.

19. The device of claim 17, wherein determining the remaining groups of the plurality of groups of storage disks comprises:

ranking storage disks in the second storage disk pool according to capacities of storage disks in the second storage disk pool; and determining the remaining groups of the plurality of groups of storage disks by selecting the second number of adjacent storage disks from the ranked storage disks in the second storage disk pool.

20. The device of claim 11, wherein selecting the group of target storage disks comprises:

calculating respective unavailable capacities of the plurality of groups of storage disks;

determining the first threshold capacity based on the calculated unavailable capacities; and selecting, from the plurality of groups of storage disks, the group of target storage disks having an unavailable capacity lower than the first threshold capacity.

21. A computer program product having a non-transitory computer readable medium which stores a set of instructions to allocate storage disks; the set of instructions, when carried out by computerized circuitry, causing the computerized circuitry to perform a method of:

determining, from a plurality of storage disks to be allocated, a plurality of groups of storage disks, each group of the plurality of groups of storage disks comprising storage disks in the plurality of storage disks corresponding to one disk array;

selecting, from the plurality of groups of storage disks, a group of target storage disks, the group of target storage disks having an unavailable capacity lower than a first threshold capacity; and creating, based on the plurality of storage disks, a storage disk set comprising at least the group of target storage disks.

* * * * *